(12) United States Patent
Gorra

(10) Patent No.: US 10,919,352 B2
(45) Date of Patent: Feb. 16, 2021

(54) TETHERED HITCH PIN

(71) Applicant: Brent Gorra, Cologne, MN (US)

(72) Inventor: Brent Gorra, Cologne, MN (US)

( * ) Notice: Subject to any disclaimer, the term of this patent is extended or adjusted under 35 U.S.C. 154(b) by 202 days.

(21) Appl. No.: 16/156,556

(22) Filed: Oct. 10, 2018

(65) Prior Publication Data

US 2020/0114709 A1 Apr. 16, 2020

(51) Int. Cl.
*B60D 1/58* (2006.01)
*B60D 1/52* (2006.01)
*B60D 1/06* (2006.01)

(52) U.S. Cl.
CPC .............. *B60D 1/58* (2013.01); *B60D 1/52* (2013.01); *B60D 1/06* (2013.01)

(58) Field of Classification Search
CPC ................. B60D 1/58; B60D 1/583
See application file for complete search history.

(56) References Cited

U.S. PATENT DOCUMENTS

| | | | | |
|---|---|---|---|---|
| 3,200,690 A * | 8/1965 | Dickman | .............. | F16B 21/125 411/337 |
| 3,596,926 A * | 8/1971 | Randall | .................... | B60D 1/60 280/507 |
| 4,671,528 A * | 6/1987 | Thompson | ............... | B60D 1/02 213/194 |
| 4,815,752 A * | 3/1989 | Young | .................... | B60D 1/247 280/406.2 |
| 5,658,004 A * | 8/1997 | Flanik | ...................... | B60D 1/60 280/507 |
| 6,116,633 A * | 9/2000 | Pride | ........................ | B60D 1/07 280/416.1 |
| 6,193,260 B1* | 2/2001 | Homan | .................... | B60D 1/02 280/504 |
| 6,412,315 B1* | 7/2002 | Cheng | ...................... | B60D 1/52 280/507 |
| 7,131,659 B2* | 11/2006 | Gomez | .................... | B60D 1/52 280/491.5 |
| 7,722,073 B2* | 5/2010 | Goettker | .................. | B60D 1/60 280/513 |
| 8,662,784 B2* | 3/2014 | Cocayne | ................ | B60D 1/025 403/154 |
| 10,384,621 B2* | 8/2019 | Mehlen | ..................... | B60R 9/10 |
| 2001/0054807 A1* | 12/2001 | Homan | .................... | B60D 1/02 280/515 |
| 2019/0275850 A1* | 9/2019 | Pucheu | .................... | B60D 1/52 |

* cited by examiner

*Primary Examiner* — Kevin Hurley
(74) *Attorney, Agent, or Firm* — Christopher R. Christenson; Kelly, Holt & Christenson, PLLC

(57) ABSTRACT

A coupling system includes a coupling member configured to couple to a connection mechanism that couples a motor vehicle to transportation equipment, and a pin, coupled to the coupling member through a tether, configured to be inserted into an aperture of the connection mechanism.

19 Claims, 6 Drawing Sheets

TETHERED HITCH PIN

BACKGROUND

Motor vehicles are often needed to tow or transport a variety of equipment which can include a trailer, a boat, a storage vehicle, etc. In order to tow or transport the variety of equipment, motors vehicles are often equipped with different types of hitches, or other coupling mechanisms, for coupling the motor vehicle to the specific transport equipment. Once attached, the motor vehicle can transport the equipment to a desired site. A hitch can include a variety of different components that may be fastened or coupled together in order to securely fasten the motor vehicle to the storage equipment.

However, in operation, to securely fasten the hitch of the motor vehicle to the equipment, several components often need to be securely fastened together. For example, a trailer hitch can include a receiving member that is configured to receive a ball mount designed to directly fasten to a coupling portion of the equipment. To securely fasten the receiving member to the ball mount, the ball mount is often inserted into the receiving portion, and a pin and clip are often inserted into an aperture of the receiving member to securely couple the ball mount to the receiving portion. However, the pin and clip often come in a variety of sizes depending on the type of hitch. If the pin and clip are not correctly inserted into the aperture, they can become dislodged and, during transport, can be separated from the motor vehicle. Additionally, insertion of the pin and clip is often a difficult task for a user and can often lead to a displacement of the pin and clip during a coupling process.

The discussion above is merely provided for general background information and is not intended to be used as an aid in determining the scope of the claimed subject matter.

SUMMARY

A coupling system includes a coupling member configured to couple to a connection mechanism that couples a motor vehicle to transportation equipment, and a pin, coupled to the coupling member through a tether, configured to be inserted into an aperture of the connection mechanism.

DETAILED DESCRIPTION OF ILLUSTRATIVE EMBODIMENTS

During a coupling operation in which a motor vehicle is to be coupled to transport equipment, it may be necessary to use a pin and clip to couple a ball mount to a receiving portion of a hitch. In one example, the pin and clip may be stored within an aperture of the ball mount prior to being inserted into an aperture of the hitch. In this example, a user has to first remove the pin and clip from the ball mount prior to inserting the pin and clip into an aperture of the hitch. Once a transport operation is completed, the pin and clip can be removed from the hitch and re-inserted into an aperture of the ball mount. However, this example operation is often troublesome for a user. By storing the pin and clip within an aperture of a ball mount, a user has to ensure the pin and clip are removed and inserted correctly, or the pin and clip can become dislodged and separated from the system. Additionally, effectively removing and inserting the pin and clip multiple times is often strenuous, as various apertures of the hitch and ball mount have varying diameters and configurations.

Furthermore, during a towing operation, various environmental factors can damage one or more components of a connection mechanism. For example, a motor vehicle traveling over undeveloped roads or fields can lead to an increased strain on one or more components of the connection mechanism. Over time, the increased strain can damage the components and lead to a user having to replace the damaged components.

In accordance with an embodiment of the present invention, a hitch pin is tethered to a coupling member configured to couple to an interface between a receiving portion of a hitch and a ball mount as will be discussed with respect to FIGS. 2-4. In this example, once the coupling member is coupled at the interface between the receiving portion and ball mount, the coupling member can serve as a seal between the receiving portion and the ball mount. In this manner, the coupling member can mitigate external strain placed on one or more components of a connection mechanism such as the receiving portion and the ball mount.

Additionally, in operation, by tethering the pin to a coupling member, a risk of misplacing or losing the pin is mitigated. Additionally, this also decreases the number of times a user has to effectively remove and insert the pin and clip during a coupling operation. For example, upon attaching the coupling member to a hitch, the tethered pin can simply be inserted into the aperture of the hitch without having to first be removed from an aperture of the ball mount. In turn, this decreases a complexity of a coupling operation in which a motor vehicle is configured to tow a trailer or other transport equipment.

Figure 1:
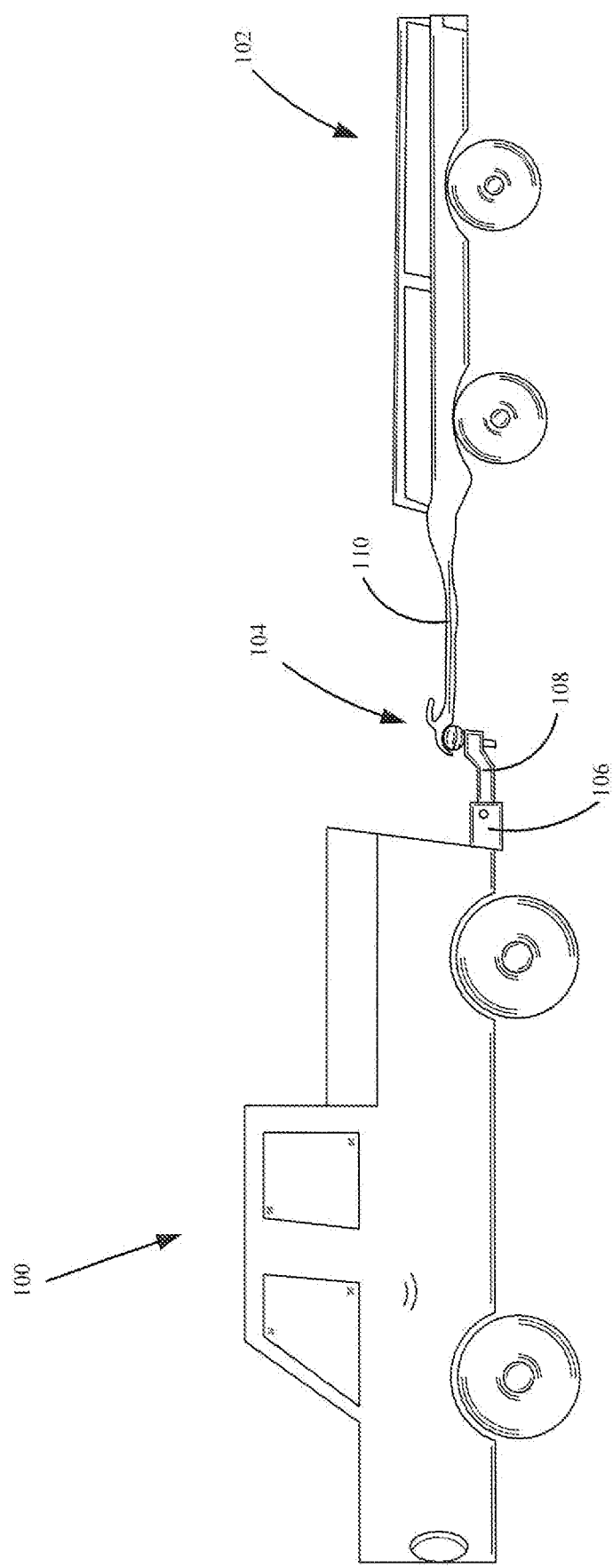
FIG. 1 is a diagrammatic view of a motor vehicle coupled to a trailer in which embodiments of the present invention can be used.

FIG. 1 is a diagrammatic view of a motor vehicle coupled to a trailer in which embodiments of the present invention can be used. As is illustratively shown, a motor vehicle 100 is coupled to a trailer 102 via a connection mechanism 104. While motor vehicle 100 is coupled to trailer 102, it is contemplated that motor vehicle 100 may be coupled to a wide variety of other transportation equipment. This can include a boat, storage vehicle, etc. Connection mechanism 104 includes a hitch 106, a ball mount 108 and a coupling portion 110. In operation, ball mount 108 is received by hitch 106 and is configured to couple to coupling portion 110. This will be discussed further with respect to FIG. 2. However, briefly, ball mount 108 can be securely coupled to receiving portion 106, using a hitch pin and clip, and coupling portion 110 can be securely fastened to a ball of ball mount 108. Once fastened, motor vehicle 100 can transport or move trailer 102 to a desired location.

Figure 2:
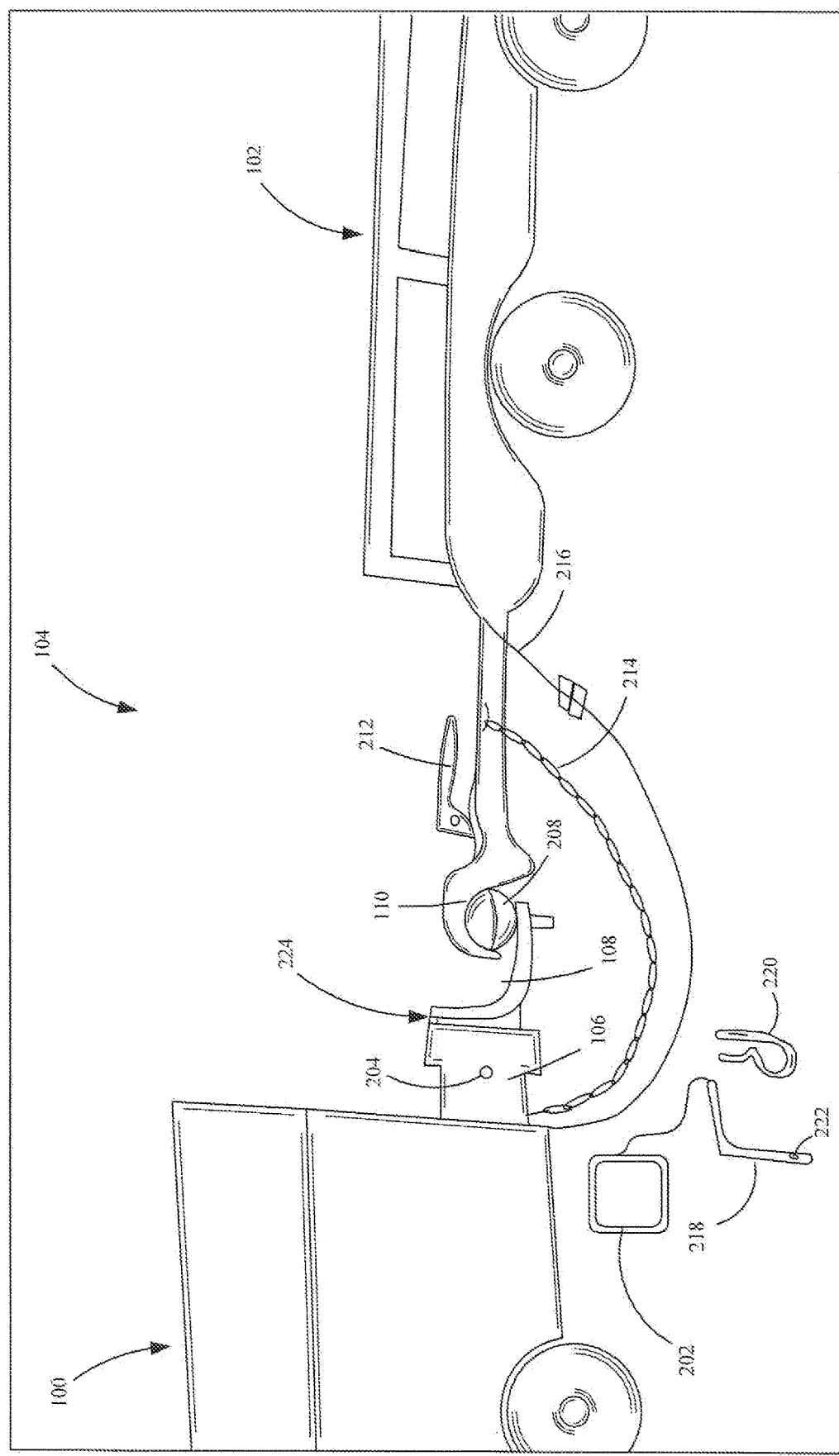
FIG. 2 is a diagrammatic view of a connection mechanism in which embodiments of the present invention can be used.

FIG. 2 is a diagrammatic view of a connection mechanism in which embodiments of the present invention can be used. Connection mechanism 104 illustratively includes hitch 106 with one or more apertures 204, a ball mount 108 with a ball 208, coupling portion 110 with a locking mechanism 212, one or more fastening devices 214, that can include a chain, rope, etc., and electrical connector(s) 216. In operation, ball mount 108 is securely fastened to hitch 106 using a coupling system (e.g., a coupling member 202 tethered to a pin 218). For example, ball mount 108 can be inserted into an opening of hitch 106 in which an aperture (illustratively shown in FIG. 3C) of ball mount 106 aligns with aperture 204 of hitch 106. Once aligned, pin 218 can be inserted through the aligned apertures to securely fasten ball mount 108 to hitch 106. Additionally, once pin 218 is inserted through aperture 204, a clip 220 can be inserted through an aperture 222 of pin 218 to ensure that pin 218 is securely fastened within aperture 204. Upon securing ball mount 108 to hitch 106, coupling portion 110 can be securely fastened to ball 208 using locking mechanism 212. Motor vehicle 100 can then tow trailer 102 in accordance with a desired transportation operation. Additionally, as illustratively shown, connection mechanism 104 can include one or more fastening devices 214 that serve as a fail-safe in case coupling portion 110 becomes disengaged with ball 208. Further, electrical connector(s) 216 can be used to provide electrical power from motor vehicle 100 to trailer 102.

In accordance with one embodiment, pin 218 is tethered to coupling member 202 configured to be positioned at an interface 224 between ball mount 108 and hitch 106. Coupling member 202 can have a variety of configurations and forms in accordance with different embodiments. In one example, coupling member 202 is substantially rectangular and, once positioned at interface 224, simultaneously contacts hitch 106 and ball mount 108. In this example, external strain placed on one or more components of connection mechanism 104 may be absorbed through coupling member 202. Coupling member 202 can comprise of a variety of materials such as rubber, plastic, or other elastomers that allow coupling member 202 to mitigate external strain placed on one or more components of connection mechanism 104. Alternatively, coupling member 202 can be made of a relatively inelastic material that is relatively fixed. In this example, coupling member 202 can be sized and shaped to fit a variety of hitches depending on a towing operation or a type of motor vehicle 100.

In operation, coupling member 202 can be coupled to ball mount 108 prior to inserting ball mount 108 into an opening of hitch 106 as will be discussed further with respect to FIG. 3C. Briefly, however, coupling member 202 can couple to a section (e.g., section 306 illustratively shown in FIG. 3C) of ball mount 108 that is inserted into the passageway of hitch 106. Upon inserting section 306 of ball mount 108 into a passageway of hitch 106, coupling member 202 can serve as a seal between hitch 106 and ball mount 108.

Furthermore, while FIG. 2 illustratively shows coupling member 202 tethered to a singular pin 218, it is expressly contemplated that any number of pins and/or clips may be tethered to coupling member 202. For example, various sizes and configurations of pin(s) may be needed depending on a type or configuration of a connection mechanism. In this example, different sized pin(s) 218 may be tethered to coupling member 202. In other examples, it is contemplated that pin(s) 218 may be interchangeably coupled to coupling member 207. In this instance, various types of pins 218 may be coupled to coupling member 202 depending on a type of connection mechanism. Additionally, it is to be understood that coupling member 202, tethered to pin 218, is removably coupled to connection mechanism 104.

Figure 3A:
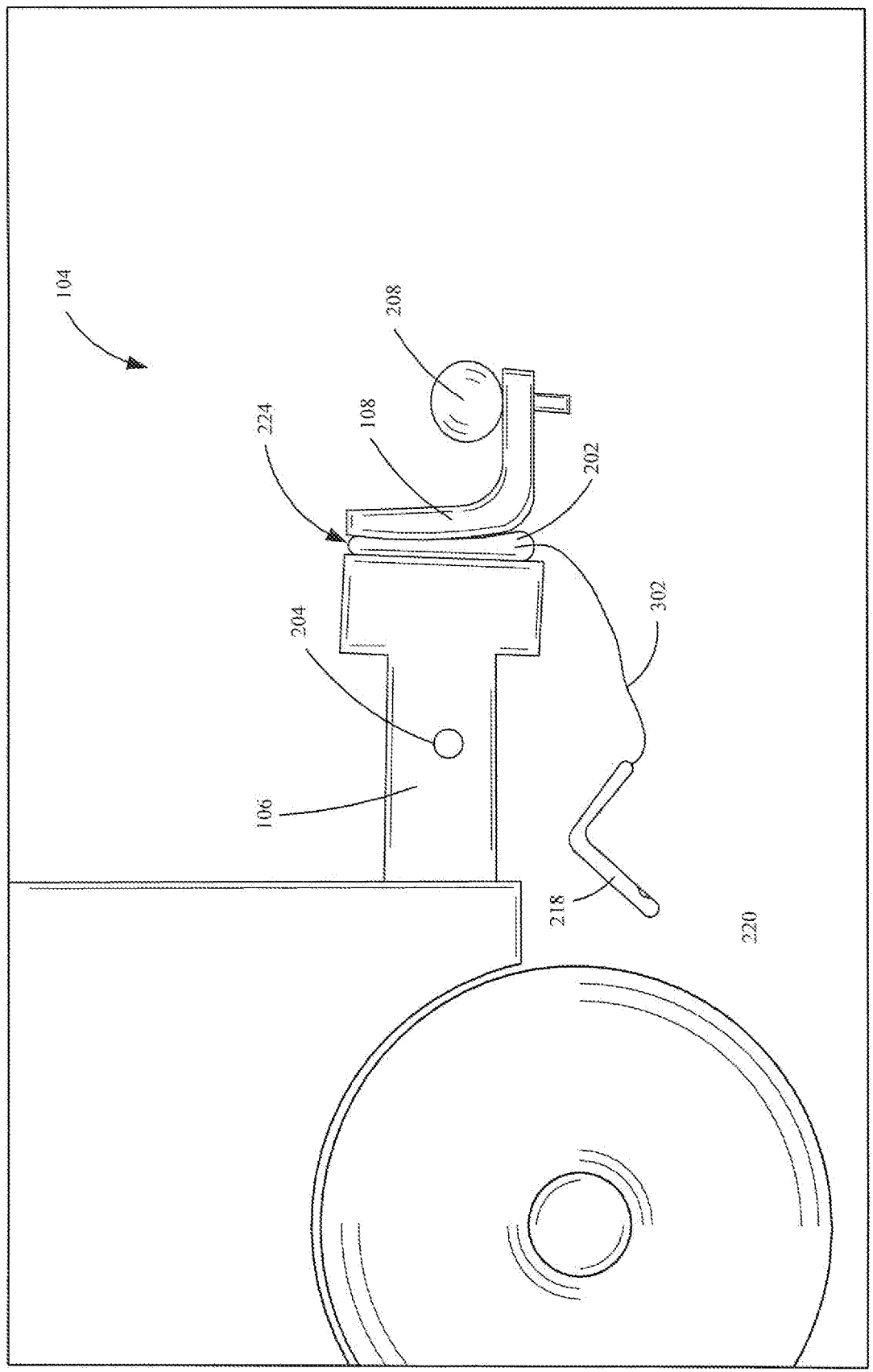
FIGS. 3A-3C are diagrammatic views of a connection mechanism in accordance with embodiments of the present invention.
Figure 3B:
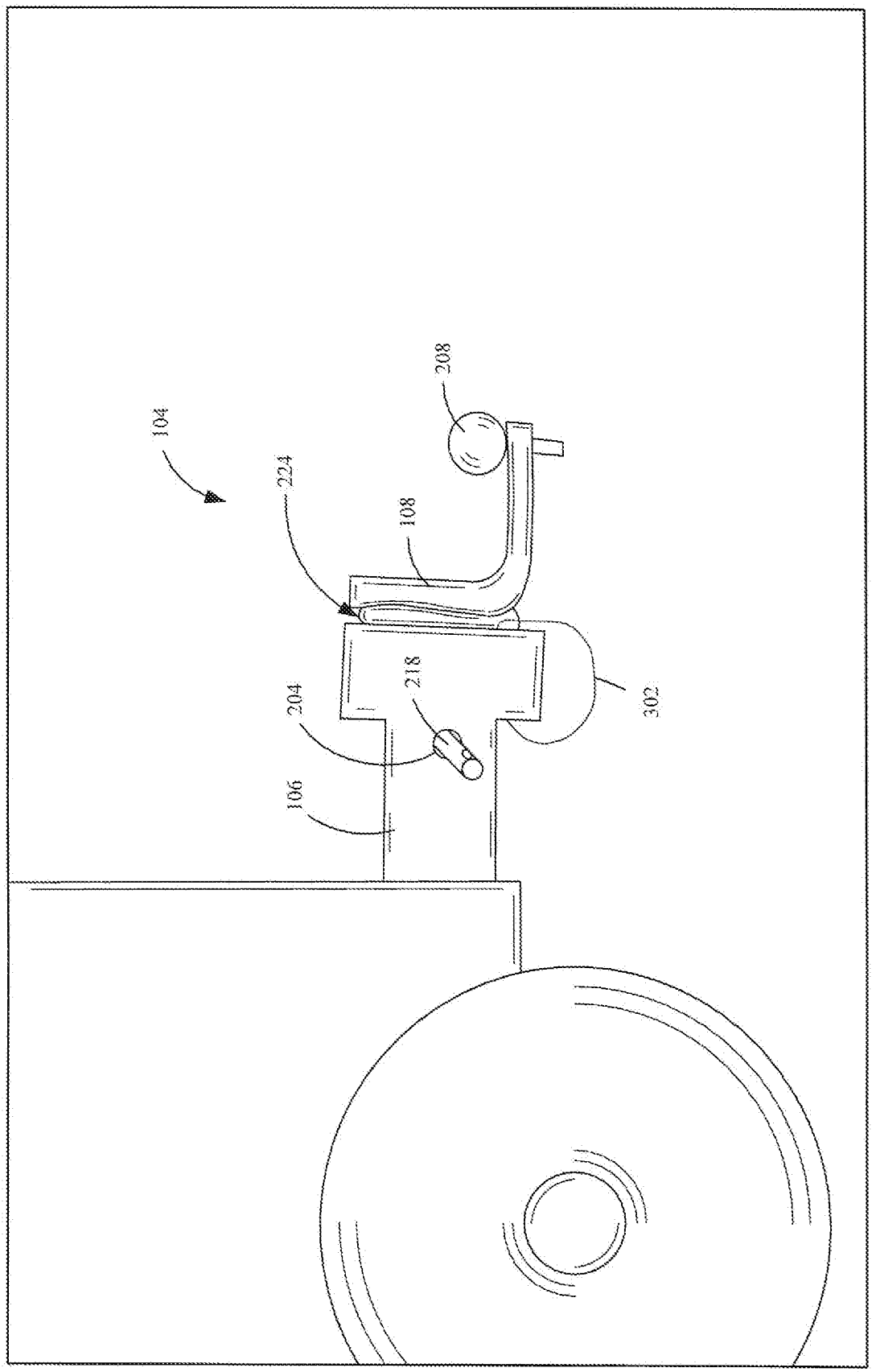
Figure 3C:
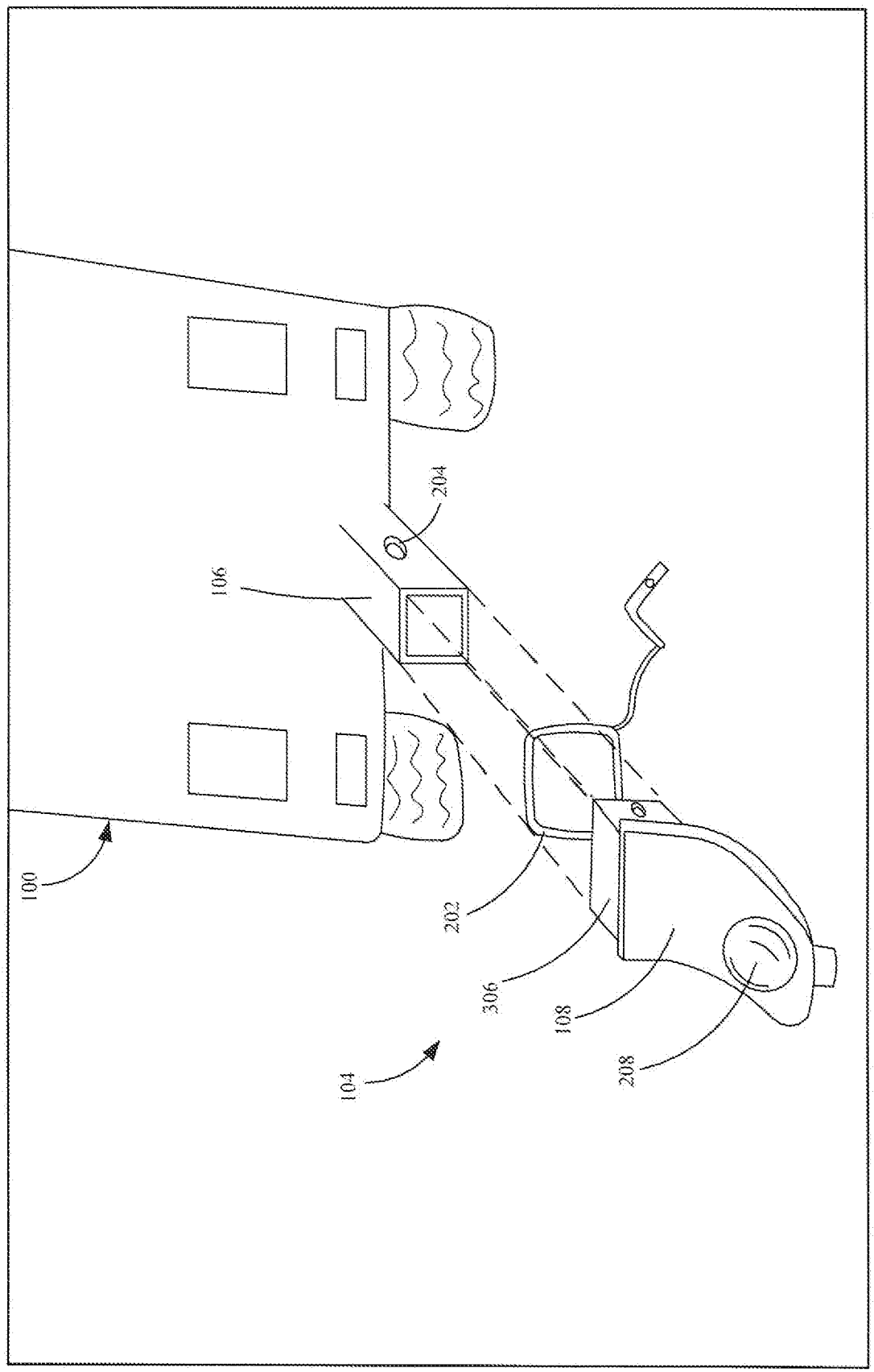

FIGS. 3A-3C are diagrammatic views of a connection mechanism in accordance with embodiments of the present invention. It is noted that some components of connection mechanism 104 are omitted from FIG. 2 for the sake of clarity only. As illustratively shown in FIGS. 3A and 3B, coupling member 202 is positioned at interface 224 between hitch 106 and ball mount 108. In this example, coupling member 202 serves as a seal between hitch 106 and ball mount 108 and mitigates strain placed on connection mechanism 104 during a towing operation.

Coupling member 202 is attached to pin 218 using tether 302. In this example, by tethering pin 218 to coupling member 202, a risk of losing pin 218 is mitigated. Tether 302 can be formed of a wide variety of materials and have differing lengths depending on a type of coupling operation. For example, certain operations may necessitate a stronger material for tether 302 depending on a towing operation. In this example, tether 302 can include a rope made of a durable, wound material such as nylon for example. However, in other examples, tether 302 can include a string, a cord, etc. Furthermore, it is contemplated that tether 302 and coupling member 202 may be manufactured as a singular piece, in which case coupling member 202 and tether 302 may be made of identical materials. Additionally, tether 302 can have varying lengths depending on a type of connection mechanism 104 or towing operation. For example, it may be desirable to wrap tether 302 around one or more components of connection mechanism 104 prior to inserting pin 218 into aperture 204.

In operation, it is to be understood that tether 302 can couple to a variety of different locations on coupling member 202 and pin 218, respectively. For example, an end of tether 302 configured to couple to pin 218 may include a loop or other circular portion that receives, and subsequently tightens to, pin 218. In this example, tether 302 can be removably coupled to different positions on pin 218. Additionally, in this example, different types of pins 218 can be interchangeably coupled to coupling member 202. For example, the loop located at the end of tether 302 may be loosened such that pin 218 can be removed from tether 302. Upon decoupling pin 218 from tether 302, tether 302 can couple to a variety of other pins having different configurations and sizes. Alternatively, it is contemplated that tether 302 can be fixed to pin 218 and/or coupling member 202 using an adhesive, mechanical mechanism, etc.

FIG. 3B is a diagrammatic view of connection mechanism 104 in which pin 218 is inserted into aperture 204 of hitch 106. As illustratively shown, pin 218 is inserted into aligned apertures of hitch 106 and ball mount 108 to securely couple hitch 106 to ball mount 108. Furthermore, to ensure pin 218 is securely fastened within the aligned apertures, a clip (e.g., clip 220 shown in FIG. 2) can be inserted through an aperture of pin 218 to ensure pin 218 is securely fastened within the aligned apertures.

FIG. 3C is an exploded view of connection mechanism 104. Connection mechanism 104 illustratively includes hitch 106 having aperture 204, ball mount 108 with an extending portion 306 and ball 208, and coupling member 202 coupled to pin 218 through tether 302. In operation, extending portion 306 of ball mount 108 can be inserted through an aperture of coupling member 202 and a passageway of hitch 106 such that apertures of extension portion 306 and hitch 106 align. Once extended portion 306 of ball mount 108 is inserted into hitch 106, coupling member 202 simultaneously contacts both hitch 106 and ball mount 108 while serving as a seal between ball mount 108 and hitch 106. Pin 218 can then be inserted through aperture 204 in order to securely couple hitch 106 and ball mount 108. Additionally, while coupling member 202 is illustratively shown as being rectangular, it is contemplated that coupling member 202 can take a variety of different shapes and configurations based on a type of connection mechanism 104 or towing operation.

Figure 4:
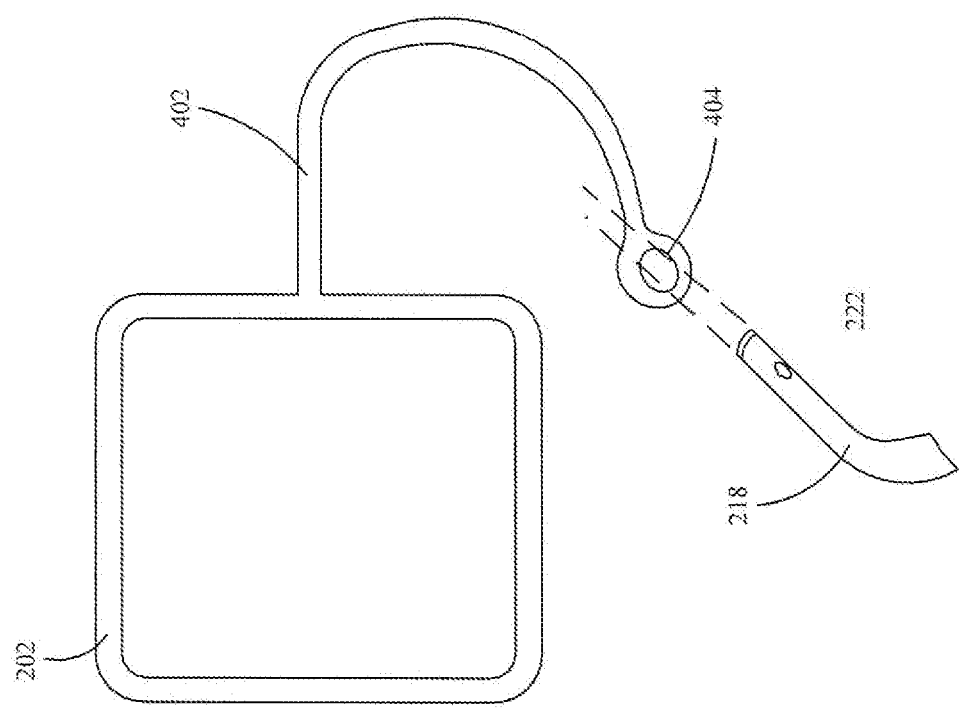
FIG. 4 is a diagrammatic view of a coupling member configured to couple to a hitch pin in accordance with embodiments of the present invention.

FIG. 4 is a diagrammatic view of a coupling member configured to couple to a hitch pin in accordance with embodiments of the present invention. Coupling member 202 illustratively includes a tether 402 with loop 404 that, in operation, receives, and couples to, pin 218. While coupling member 202 and tether 402 are illustratively shown as a singular, manufactured piece, in other examples, it is expressly contemplated that tether 402 may be a separate piece fastened to coupling member 202 after manufacture of coupling member 202. Additionally, it is contemplated that coupling member 202 may be manufactured with any number of tethers.

Although the present invention has been described with reference to preferred embodiments, workers skilled in the art will recognize that changes may be made in form and detail without departing from the spirit and scope of the invention.

What is claimed is:

1. A coupling system, comprising:
   a coupling member configured to couple to a ball mount that couples a motor vehicle to transportation equipment, the coupling member being configured to couple to the ball mount at a position spaced from a ball of the ball mount;
   a tether coupled to the coupling member;
   a pin coupled to the tether, the pin being configured to be inserted into an aperture of the connection mechanism
   wherein the coupling member is configured to encircle the ball mount.

2. The coupling system of claim 1, wherein the coupling member is configured to couple to the ball mount at an interface between a hitch and the ball mount.

3. The coupling system of claim 2, wherein, upon coupling the coupling member to the connection mechanism at the interface, the coupling member is configured to provide a seal between the hitch and the ball mount.

4. The coupling system of claim 1, wherein the coupling member comprises an elastic material.

5. The coupling system of claim 4, wherein the elastic material comprises rubber.

6. The coupling system of claim 1, wherein the coupling member comprises an inelastic material.

7. The coupling system of claim 1, wherein the coupling member is substantially rectangular.

8. The coupling system of claim 1, wherein the tether comprises a loop configured to receive, and couple to, an end of the pin.

9. The coupling system of claim 1, wherein the coupling member and the tether are manufactured as a singular piece.

10. The coupling system of claim 1, wherein the coupling member and the tether are manufactured as separate pieces.

11. A connection mechanism configured to couple a motor vehicle to transportation equipment, comprising:
    a ball mount comprising a rectangular extension portion configured to be inserted into the a receiver opening of a receiver on the motor vehicle;
    a coupling member tethered to a pin, the coupling member encircling the rectangular extension portion at an interface between the ball mount and the receiver; and
    wherein, upon positioning the coupling member at the interface between the ball mount and the receiver, the coupling member is configured to serve as a seal between the ball mount and the receiver.

12. The connection mechanism of claim 11, wherein, upon inserting the rectangular extension portion into the receiver, at least one aperture of the rectangular extension portion is configured to align with the at least one aperture of the receiver such that the pin can be simultaneously inserted into the aligned apertures.

13. The connection mechanism of claim 12, wherein the coupling member comprises an elastic material.

14. The connection mechanism of claim 13, wherein the elastic material is substantially rectangular with a central aperture configured to receive the extension portion of the ball mount.

15. The connection mechanism of claim 11, wherein the coupling member comprises an inelastic material having a rectangular shape with a central aperture configured to receive the extension portion of the ball mount.

16. A connection mechanism configured to couple a motor vehicle to transportation equipment, comprising:
    a receiver coupled to the motor vehicle;
    a ball mount coupled to the receiver; and
    an elastomeric coupling member coupled to an interface between the receiver and the ball mount, the coupling member having a tether coupled to a pin.

17. The connection mechanism of claim 16, wherein the tether and the coupling member are manufactured as a singular piece.

18. The connection mechanism of claim 17, wherein the tether and the coupling member comprise an elastic material.

19. The connection mechanism of claim 18, wherein the tether comprises a loop configured to receive, and couple to, an end of the pin.

* * * * *